J. BEERS.
Lifting-Jacks.
No. 158,618.
Patented Jan. 12, 1875.
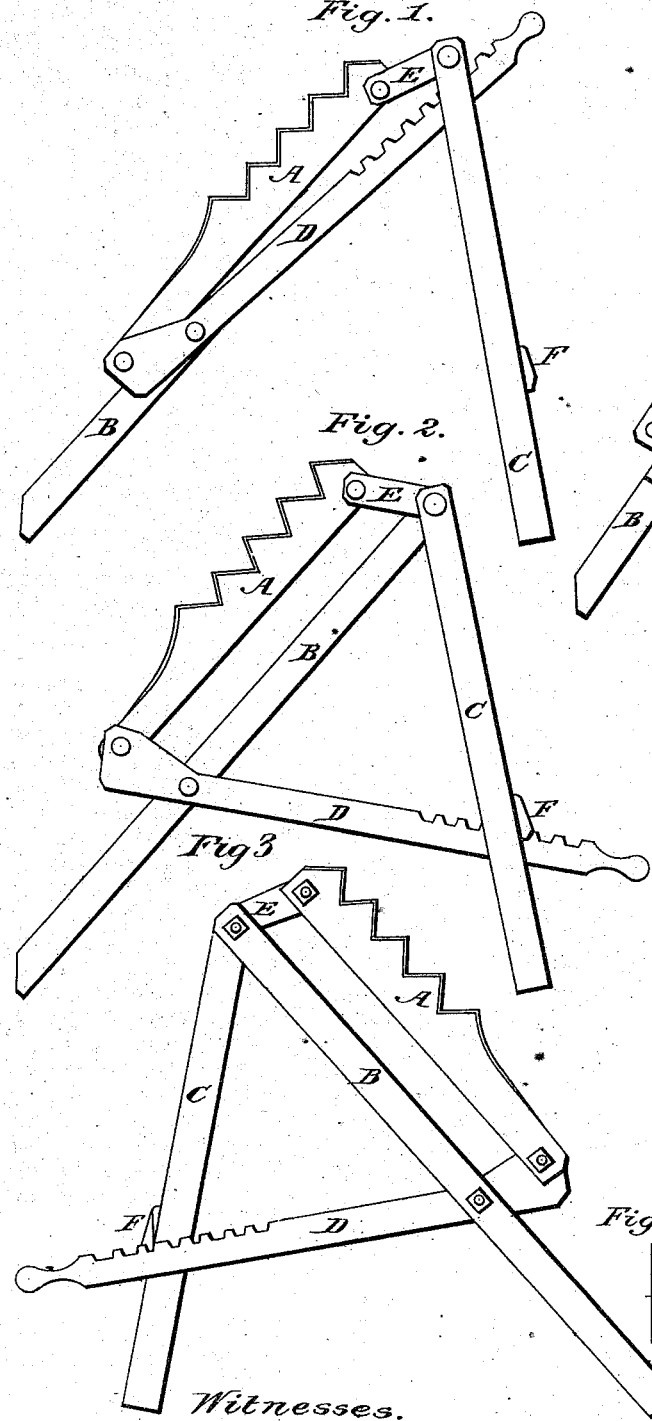
Witnesses.
David Beers.
Frances Green.
Inventor.
John Beers.

UNITED STATES PATENT OFFICE.

JOHN BEERS, OF DARKE COUNTY, OHIO.

IMPROVEMENT IN LIFTING-JACKS.

Specification forming part of Letters Patent No. 158,618, dated January 12, 1875; application filed November 23, 1874.

*To all whom it may concern:*

Be it known that I, JOHN BEERS, of the county of Darke and State of Ohio, have invented a new and useful Machine for Raising Carriages, called a "Carriage-Jack;" and I do hereby declare that the following is a full, clear, and exact description of the construction and operation of the same, reference being had to the annexed drawing making a part of the specification, in which—

Figures 1, 2, 3, and 4 are side views. Fig. 5 is a rear view of Fig. 4, and Fig. 10 is a rear view of Figs. 2 and 3. The remaining figures are different enlarged views of the catch F, Fig. 6 being a back elevation, Fig. 7 a side view, Fig. 8 a front elevation, and Fig. 9 is an end view.

My machine is constructed of the notched bar A, the legs B and C, the notched lever D, and the bar E, all made of wood, and united together, as shown on the drawing, by means of iron bolts and nuts. The catch F is also made of wood, and screwed fast to the rear part of the leg C, and all of said different parts are constructed of the form shown on the drawings. The notches of the bar A are shod with hoop-iron. The lever D is also notched to receive the catch F. The leg B is made a little longer than the leg C and slightly beveled at the lower end.

Fig. 6 shows the side of the catch F that is next to the leg C, which side is beveled, as shown in Fig. 7, or end view in Fig. 9, so that said catch will fit neatly against the rear part of the lever D when the machine is closed, as shown in Fig. 5.

My machine is operated as follows: When not in use it is closed up, as shown in Fig. 4, all of the parts being shoved together. In using said carriage-jack, the notched bar A is placed under the axle of the carriage, the lever D is seized at the handle, and at the same time the leg C is drawn out, as in Fig. 1, and the leg C is moved in or out to assist in bringing the notched bar A under and against the axle of the carriage. The lever D is then pressed down and past the catch F, when the lever D, by its own action or spring, passes under the catch F and against the leg C, as shown in Figs. 2 and 3. The catch F does not always at first enter a notch on the lever D; but in case the legs B or C slip, the catch F will be caught in one of said notches, after which the legs B and C will be prevented from any further slipping, and the lever D will be firmly held when the carriage-axle will be raised. To lower said axle move the lever D from under the catch F; then raise said lever D, and the notched bar A will be lowered.

What I claim as my invention, and desire to secure by Letters Patent, is—

A carriage-jack formed of the notched bar A, the legs B and C, the bar E, the notched lever D, and the catch F, constructed and combined substantially as herein shown and described.

JOHN BEERS.

Attest:
DAVID BEERS,
FRANCES GREEN.